(12) United States Patent
Burrows et al.

(10) Patent No.: US 10,044,718 B2
(45) Date of Patent: Aug. 7, 2018

(54) AUTHORIZATION IN A DISTRIBUTED SYSTEM USING ACCESS CONTROL LISTS AND GROUPS

(71) Applicant: Google LLC, Mountain View, CA (US)

(72) Inventors: Michael Burrows, Mountain View, CA (US); Martin Abadi, Mountain View, CA (US); Himabindu Pucha, Mountain View, CA (US); Adam Sadovsky, Mountain View, CA (US); Asim Shankar, Mountain View, CA (US); Ankur Taly, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/824,727

(22) Filed: Aug. 12, 2015

(65) Prior Publication Data

US 2016/0352744 A1    Dec. 1, 2016

Related U.S. Application Data (60) Provisional application No. 62/167,000, filed on May 27, 2015.

(51) Int. Cl.
*H04L 29/06*    (2006.01)
*G06F 21/60*    (2013.01)
*G06F 21/62*    (2013.01)

(52) U.S. Cl.
CPC .......... *H04L 63/101* (2013.01); *G06F 21/604* (2013.01); *G06F 21/6218* (2013.01); *H04L 63/102* (2013.01); *G06F 2221/2141* (2013.01)

(58) Field of Classification Search
CPC ... H04L 63/101; H04L 63/102; G06F 21/604; G06F 21/6218
(Continued)

(56) References Cited

U.S. PATENT DOCUMENTS 5,173,939 A    12/1992    Abadi et al.
5,220,604 A    6/1993    Gasser et al.
(Continued)

OTHER PUBLICATIONS

Aguilera et al., "Block-Level Security for Network-Attached Disks", 2003.
(Continued)

*Primary Examiner* — Eleni A Shiferaw
*Assistant Examiner* — Angela R Holmes
(74) *Attorney, Agent, or Firm* — Lerner, David, Littenberg, Krumholz & Mentlik LLP (57) ABSTRACT

In a method of controlling sharing of an object between entities in a distributed system, a processor will identify an object and generate an access control list (ACL) for the object so that the ACL includes a list of clauses. Each clause will include a blessing pattern that will match one or more blessings, and at least one of the clauses also may include a reference to one or more groups. Each group represents a set of strings that represent blessing patterns or fragments of blessing patterns. The processor may generate each clause of the ACL as either a permit clause or a deny clause to indicate whether an entity or entities that have a blessing matched by the blessing pattern are permitted to access the object. The processor will save the ACL to a data store for use in responding to a request to access the object.

18 Claims, 4 Drawing Sheets

(58) Field of Classification Search
USPC .......................................................... 726/4
See application file for complete search history.

(56) References Cited

U.S. PATENT DOCUMENTS

| | | | |
|---|---|---|---|
| 6,195,698 | B1 | 2/2001 | Lillibridge et al. |
| 6,279,111 | B1 | 8/2001 | Jensenworth et al. |
| 6,308,273 | B1 | 10/2001 | Goertzel et al. |
| 6,367,009 | B1 | 4/2002 | Davis et al. |
| 6,678,828 | B1 | 1/2004 | Pham et al. |
| 8,042,163 | B1 | 10/2011 | Karr et al. |
| 8,418,222 | B2 | 4/2013 | Gbadegesin et al. |
| 8,533,796 | B1 | 9/2013 | Shenoy et al. |
| 8,752,203 | B2 | 6/2014 | Reinertsen |
| 8,793,509 | B1 | 7/2014 | Nelson et al. |
| 8,898,766 | B2 | 11/2014 | Garmark et al. |
| 2002/0069174 | A1 | 6/2002 | Fox et al. |
| 2003/0028585 | A1 | 2/2003 | Yeager et al. |
| 2003/0055894 | A1 | 3/2003 | Yeager et al. |
| 2003/0055898 | A1 | 3/2003 | Yeager et al. |
| 2003/0070070 | A1 | 4/2003 | Yeager et al. |
| 2004/0068757 | A1 | 4/2004 | Heredia |
| 2004/0083359 | A1 | 4/2004 | Camus et al. |
| 2004/0088347 | A1 | 5/2004 | Yeager et al. |
| 2004/0088348 | A1 | 5/2004 | Yeager et al. |
| 2004/0088369 | A1 | 5/2004 | Yeager et al. |
| 2004/0088646 | A1 | 5/2004 | Yeager et al. |
| 2004/0133640 | A1 | 7/2004 | Yeager et al. |
| 2005/0021969 | A1 | 1/2005 | Williams et al. |
| 2005/0086300 | A1 | 4/2005 | Yeager et al. |
| 2007/0261102 | A1 | 11/2007 | Spataro et al. |
| 2009/0064342 | A1* | 3/2009 | Chan .................. G06F 21/6218 726/27 |
| 2009/0254978 | A1 | 10/2009 | Rouskov et al. |
| 2009/0271847 | A1 | 10/2009 | Karjala et al. |
| 2010/0212004 | A1 | 8/2010 | Fu |
| 2010/0293385 | A1 | 11/2010 | Nanda et al. |
| 2011/0055902 | A1 | 3/2011 | Brodfuehrer et al. |
| 2011/0225643 | A1 | 9/2011 | Faynberg et al. |
| 2011/0265172 | A1 | 10/2011 | Sharma et al. |
| 2012/0102566 | A1 | 4/2012 | Vrancken et al. |
| 2012/0204221 | A1 | 8/2012 | Monjas Llorente et al. |
| 2012/0210448 | A1 | 8/2012 | Vrancken et al. |
| 2012/0317655 | A1 | 12/2012 | Zhang et al. |
| 2013/0007845 | A1 | 1/2013 | Chang et al. |
| 2013/0019299 | A1 | 1/2013 | Vepsalainen et al. |
| 2013/0036455 | A1 | 2/2013 | Bodi et al. |
| 2013/0086645 | A1 | 4/2013 | Srinivasan et al. |
| 2013/0145435 | A1 | 6/2013 | Fu |
| 2013/0191884 | A1 | 7/2013 | Leicher et al. |
| 2014/0020064 | A1 | 1/2014 | Hildebrand |
| 2014/0026193 | A1 | 1/2014 | Saxman et al. |
| 2014/0040987 | A1 | 2/2014 | Haugsnes |
| 2014/0047513 | A1 | 2/2014 | van 't Noordende |
| 2014/0101722 | A1 | 4/2014 | Moore |
| 2014/0208119 | A1 | 7/2014 | Chang et al. |
| 2014/0245417 | A1 | 8/2014 | Hu et al. |
| 2014/0279556 | A1 | 9/2014 | Priebatsch et al. |
| 2014/0282881 | A1 | 9/2014 | Li et al. |
| 2014/0337955 | A1 | 11/2014 | Mendelovich et al. |
| 2015/0089569 | A1 | 3/2015 | Sondhi et al. |

OTHER PUBLICATIONS

Birgisson et al., "Macaroons: Cookies with contextual caveats for decentralized authorization in the cloud," 21st Annual Network and Distributed System Security Symposium (2014) (Abstract only).
Bodei et al. "Authentication via localized names," In Proceedings of the 12th IEEE Computer Security Foundations Workshop, CSFW '99, IEEE Press, Jun. 1999, Mordano, Italy, pp. 98-110.
Clarke, D. et al., "Certificate Chain Discovery in SPKI/SDSI", Sep. 13, 2001, pp. 1-26.
Hammar-Lahav E., Ed., "The OAuth 1.0 Protocol", Internet Engineering Task Force ISSN: 2070-1721, Apr. 2010.
Howard Gobioff, "Security for a High Performance Commodity Storage Subsystem", Jul. 1999.
Mittra et al., "A Flow-Based Approach to Datagram Security", Proceedings of the ACM SIGCOMM '97, Sep. 14-18, 1997, Cannes, France.
Reed et al., "Authenticating Network Attached Storage", Jun. 6, 2003.
Rivest, R. et al., "SDSI—A Simple Distributed Security Infrastructure", Sep. 15, 1996.
Tanenbaum et al., "The Amoeba Distributed Operating System—A Status Report", Dept. of Mathematics and Computer Science, Vrije Universiteit, Amsterdam, The Netherlands, pp. 1-22.
Woo and Lam, "Designing a Distributed Authorization Service," IEEE (Feb. 1998), pp. 419-429.
International Preliminary Report on Patentability dated Dec. 7, 2017 in Application PCT/US2016/024477.

* cited by examiner

AUTHORIZATION IN A DISTRIBUTED SYSTEM USING ACCESS CONTROL LISTS AND GROUPS

RELATED APPLICATIONS AND CLAIM OF PRIORITY

This patent document claims priority to U.S. Provisional Patent Application No. 62/167,000, filed May 27, 2015, the disclosure of which is fully incorporated by reference into this document.

BACKGROUND

This disclosure describes mechanisms for identification, authentication, and authorization of communications between two or more electronic devices.

When electronic devices such as mobile electronic devices and servers engage in communication via a network, it is important that communications be authenticated and access controlled. Participants in a distributed system (such as a collection of electronic devices that can each communicate with each other via one or more communication networks) typically have a need to know with whom they are communicating, and a means of expressing who may perform certain actions or access certain services. The process of identifying and/or verifying a device or its user may be referred to as "authentication." The process of identifying what actions or services one or more devices or users may perform or use may be referred to as "authorization."

Groups provide a useful level of indirection for authorization policies, in particular those described by access control lists (ACLs). When ACLs refer to groups, the ACLs can be simple and short. As an example, an ACL may permit access to all principals in the group "FriendlyClients", which itself consists of users in the group Friends with devices in the group Devices via programs in the group "TrustedApps". The definitions of these groups can be managed separately from the ACL and shared by many other ACLs.

In distributed systems, the use of groups is not straightforward. For example, it requires a distributed scheme for naming groups. Even with such a scheme, group definitions may not all be available at the time of an ACL check. In addition, groups may have unintended consequences or may contain circularities that no single participant in the system can detect locally. Further, the entities that control the groups may not all be equally trusted. In addition, lookups of group membership may incur the costs of remote communication and require appropriate security and privacy measures.

This document describes methods and devices that are directed to improving authentication and/or authorization in distributed systems.

SUMMARY

In various embodiments, a system implements a method of controlling sharing of an object between entities in a distributed system. A processor will identify an object and generate an access control list (ACL) for the object so that the ACL includes a list of clauses. Each clause will include a blessing pattern that will match one or more blessings, and one or more of the clauses may also include a reference to one or more groups. Each group represents a set of strings that represent blessing patterns or fragments of blessing patterns. The processor may generate each clause of the ACL as either a permit (allow) clause or a deny clause to indicate whether an entity (or entities) that have a blessing matched by the blessing pattern is (or are) permitted to access the object. The processor will save the ACL to a data store for use in responding to a request to access the object.

After the ACL is generated, then when a processing device receives, from a client device, a request to access the object, the processing device may access the ACL. If it determines that the ACL includes at least one clause with a relevant blessing pattern that matches a blessing presented in a request, it may parse each determined clause of the ACL to determine whether the clause comprises a permit clause or a deny clause, and it may use results of the parsing to decide whether to grant or deny the client device access to the object, and in response either grant or deny the client device access to the object.

Optionally, when determining that the ACL includes at least one clause, the system may determine that the ACL includes multiple clauses with a matching blessing pattern. If so, then when using results of the parsing to decide whether to grant or deny the client device access to the object the system may grant the client device access to the object only if the later of the determined clauses comprises the permit clause, otherwise the system may deny the client device access to the object. Alternatively, when using results of the parsing to decide whether to grant or deny the client device access to the object the system may grant the client device access to the object only if the earlier of the determined clauses comprises the permit clause, otherwise it may deny the client device access to the object.

Optionally, when determining that the ACL includes at least one clause, the system may determine that the ACL includes a group. If so, the system may send a request to a group server to determine whether the request is associated with a member of the group, receive a response from the group server, and also use the response from the group server when deciding whether to grant or deny the client device access to the object. When receiving the response from the group server, the system may receive a first indication comprising a portion of the request that is associated with the group, and also receiving a second indication comprising a remainder of the request that is not associated with the group.

In some embodiments, each blessing and group may be represented by one or more human-readable names. In addition, at least one of the group names may be embedded within an individual component of a blessing pattern.

In some embodiments, the system also may include a group server having a group server processing device. If so, the group server may save a definition of a group to a computer readable memory so that the definition of a group is associated with a first time, and also save an updated definition of a group to the computer readable memory so that the updated definition of a group is associated with a second time. When generating the response, the group server may then determine a time associated with the request, and it may use the time to determine which version of the group definition to use in evaluating the request.

DETAILED DESCRIPTION

Terminology that is relevant to this disclosure includes:

An "electronic device" or a "computing device" refers to a device that includes a processor and non-transitory, computer-readable memory hardware. The memory may contain or receive programming instructions that, when executed by the processor, cause the electronic device to perform one or more operations according to the programming instructions. Examples of computing devices include personal computers, servers, mainframes, gaming systems, televisions, and mobile electronic devices such as smartphones, personal digital assistants, cameras, tablet computers, laptop computers, media players and the like. In a client-server arrangement, the client device and the server are each electronic devices.

An "object" is a process, data set, or other resource, function or transaction for which a server controls access by authorized clients.

A "principal" is an entity (such as a networked resource) that issues a request. A principal has an identity and can be identified by a name and/or a key.

A "blessing" is a set of cryptographic or other electronically presented credentials for a principal, which contain one or more human-readable names. (For simplicity, this document may use the abbreviated term "blessing" to also refer to a blessing name where the meaning is clear based on the context.) The human-readable name may be referred to as a "blessing name."

A "human-readable name" is a representation of data that can naturally be read and understood by humans, such as one made up of characters of the English or other human language, optionally with one or more symbols having meaning that is understood by a human. Examples include a person's name, an email address which contains the @ symbol representing "at", or the like.)

The term "group," when used as a noun, is intended to refer to an object representing a set of strings that represent blessing patterns or fragments of blessing patterns. Because the blessing patterns are made of human-readable names, group names and their content also may be human-readable.

A "blessing pattern" is a slash-separated sequence of components, where each component is either a slash-free string of a blessing or a group reference.

A "caveat" is a restraint on an entity's authority to access an object. For example, a caveat may limit the entity to only certain functions of a service, or only certain services within a group of services. A caveat also may include a predicate that must hold true for a blessing to be usable at all.

An "access control list" or "ACL" is a list, table or other data structure that identifies the permissions that are attached to a particular object or set of objects. The permissions may involve a single entity or multiple entities. In the embodiments described in this document, an ACL also may be made of human-readable names.

A "certificate" is an electronic document that a principal may present to prove what names have been associated with a principal's public key.

"Chaining" of certificates means that each certificate is signed by the private counterpart of the public key associated with the previous certificate. The first certificate in the chain (i.e., the root certificate) may be (although is not necessarily) self-signed by the client (i.e., signed by the private counterpart of the public key mentioned in the first certificate). The second certificate is also signed by the client as the previous certificate holder, but the third certificate would be signed by client of the second certificate.

A "certificate chain" is an ordered group of certificates that have been signed by chaining as described above.

Except where specifically stated otherwise, the singular term "processor" or "processing device" is intended to include both single-processing device embodiments and embodiments in which multiple processing devices together or collectively perform a process. Similarly, except where specifically stated otherwise, the terms "memory," "data store," "data storage facility" and the like are intended to include single device embodiments, embodiments in which multiple memory devices together or collectively store a set of data or instructions, as well as individual sectors within such devices.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Figure 1:
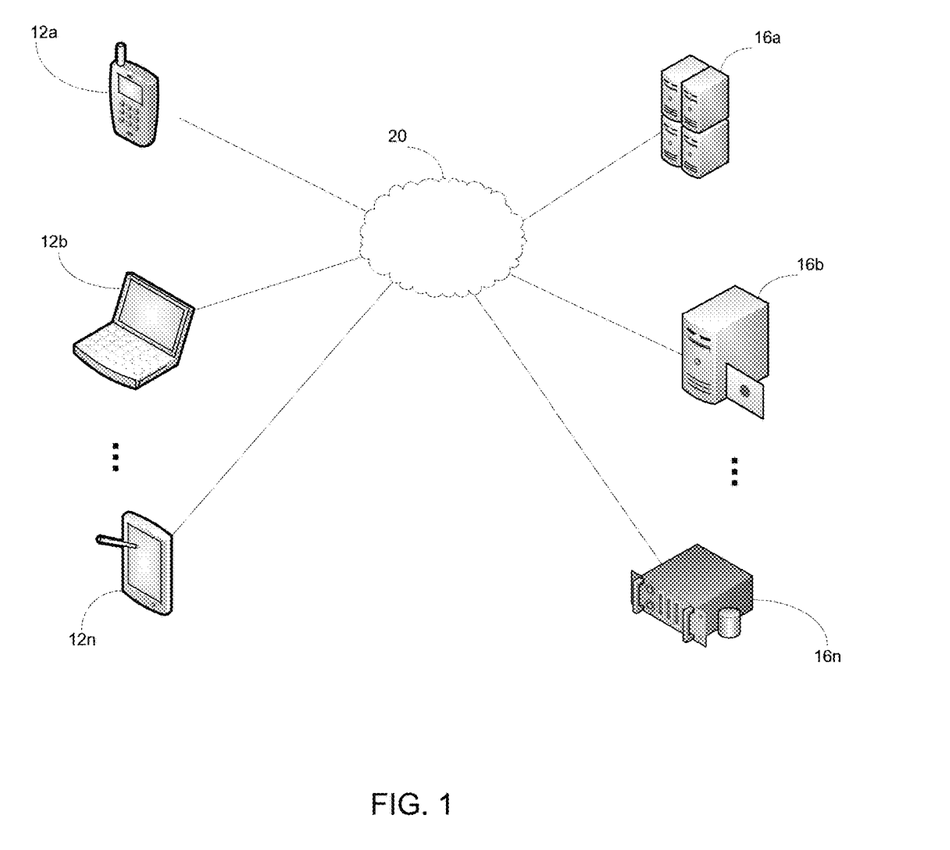
FIG. 1 illustrates an example of a distributed system that includes various client devices and servers.

FIG. 1 illustrates various embodiments of a distributed system in which one or more client devices 12a . . . 12n communicate with one or more other processing devices such as servers 16a . . . 16n via one or more communication networks 20 such as a wireless phone network, the Internet, an intranet, a local area network, a wide area network, another type of network, or any combination of these. Any of the servers 16a . . . 16n may be used to make one or more objects available to authorized client devices. In addition, one or more of the servers (e.g., 16b) may act as a certificate server or otherwise store access credentials such as encryption keys for any of the client devices 12a . . . 12n in a structure such as an access control list. Any of the servers 16n also may be a group server that stores details of one or more groups, such as lists of group members. In addition, any client device (e.g., 12a) may delegate its authority to access various objects to one or more of the other client devices (e.g., 12b).

This document describes a design for access control with groups in a new set of libraries, tools, and services that may help simplify the process of building distributed applications. Various embodiments of the system may support forms of delegation, via local names. The system also may support negative clauses in ACLs, with conservative semantics when group definitions are not available or contain circularities. Moreover, it can help ensure privacy and efficiency in group-membership checks.

In the disclosed embodiments, each principal is identified with a public key, to which one or more blessings (in the form of human-readable names) are bound. Concretely, these blessings may be given in public-key certificate chains bound to the principal's public key. For instance, a television set owned by a principal with the blessing "Alice" might have the blessing "Alice/TV". Here, TV is a local name, which any principal may be able to generate and apply autonomously. Principals may have multiple blessings, each reflecting the principal that granted it. For example, the same television set might also have the blessing "SomeCorp/TV123" from its manufacturer.

When this document uses the term "blessing" in the singular form, it is intended to include forms in which either a single blessing or multiple blessings are used, unless specifically specified as a single blessing option. The blessings may be stored in a data store. Clients and servers may selectively present their blessings to each other, based on the level of information that they want to reveal to each other.

Blessings are the basis for authentication and authorization. When a client engages in communication with a server, the client may identify a server based on one or more principals and blessings presented by the server. Similarly, a server may identify, authenticate and authorize a client based on one or more principals and blessings presented by the client. Specifically, the "Bless" operation allows a principal to extend one of its blessings and create a blessing bound to another principal's public key, thereby delegating the authority associated with the blessing. For example, an ACL may include the clause "Allow Alice/TV", so that all principals with a blessing that matches "Alice/TV" will have access to the object that the ACL protects, and a principal with the blessing "Alice" may choose to grant the blessing "Alice/TV" to its television set. In practice, the delegation of authority is seldom unconditional. Caveats can restrict the conditions under which blessings are usable, for example limiting their validity to a certain time period.

In various embodiments, groups may contain not only atomic names such as "Alice" and "TV", but also longer, compound blessings such as "Alice/TV." Furthermore, the definition of a group may refer to other groups at the top level (e.g., "Friends includes OldFriends") and as part of compound blessings (e.g., "FriendlyClients" includes "Friends/Devices/TrustedApps"). Thus, one may regard groups as formal languages, with group definitions inducing grammar productions. Unlike in traditional formal languages, however, the grammar productions are distributed, so the system described in this document may consider concerns such as communication costs, availability, and privacy.

In a naming convention of the disclosed embodiments, the system may assume a set of group names, and a disjoint set of other names that may be referred to as ordinary names. In this document, g represents group names, and n represents ordinary names Ordinary names and group names have quite different forms and usages. In particular, each group name suffices for determining an appropriate server that can answer questions about the group and to query that server. On the other hand, ordinary names may be fundamentally local names, simple strings that can be interpreted differently across a system. They may refer to a variety of entities (users, services, programs, program versions, etc.), although they may however be subject to conventions.

The syntax of blessings and blessing patterns may use a grammar such as the following:

B::=n blessings
|n/B
P::=n blessing patterns
|g
|n/P
|g/P

In the grammar described above, B ranges over blessings and P over blessing patterns; and the slash mark (/) is a binary operator for forming blessings and blessing patterns. Thus, a blessing may be represented by a non-empty sequence of ordinary names, separated by a slash mark (/), while a blessing pattern may be represented by a non-empty sequence of ordinary names and group names, separated by the slash mark (/). We take the slash mark (/) to be associative.

For example, if "Alice" and "Phone" are ordinary names, and "Friends" and "Devices" are group names, then: (1) "Alice" and "Alice/Phone" are blessings, and they are also blessing patterns; (2) "Alice/Alice", "Phone/Phone", and "Phone/Alice", are also blessings and blessing patterns though they may not necessarily be meaningful; and (3) "Friends", "Friends/Phone", "Alice/Devices", and "Friends/Devices" are all blessing patterns, but not blessings because each of them contain groups.

A human-readable name such as "AllBlessings" may represent the set of all blessings. When B and B' are blessings, in this document we may write B≤B', and say that B is a prefix of B', if the sequence of ordinary names in B is a prefix of that in B'. We take this prefix relation to be reflexive, not strict. In other words, every blessing is a prefix of itself.

In some embodiments as noted above, group references may be embedded within blessing patterns. Optionally, for ease of identification, group references may be bounded by additional characters, such as "<" at the beginning and ">" at the end. Thus, a blessing pattern permitting access to a "CloudMail" app running on any device running in X Corporation employee John Doe's "AllMyDevices" group might look like this:

XCcorp/johndoe/<grp:xcorp/grp/johndoe/AllMyDevices>/CloudMail

In addition, when group references are embedded within blessing patterns, in some embodiments a group name may appear within an individual component of a blessing pattern, rather than being the entire component that is contained within two slashes. As an example, consider the following ACL entry:

wombat/foo<group_name>bar

In this ACL entry, "group_name" refers to a group containing "1", "2" and "3". Thus, the ACL entry represents the following group:

wombat/foo1bar
wombat/foo2bar
wombat/foo3bar.

Figure 2:
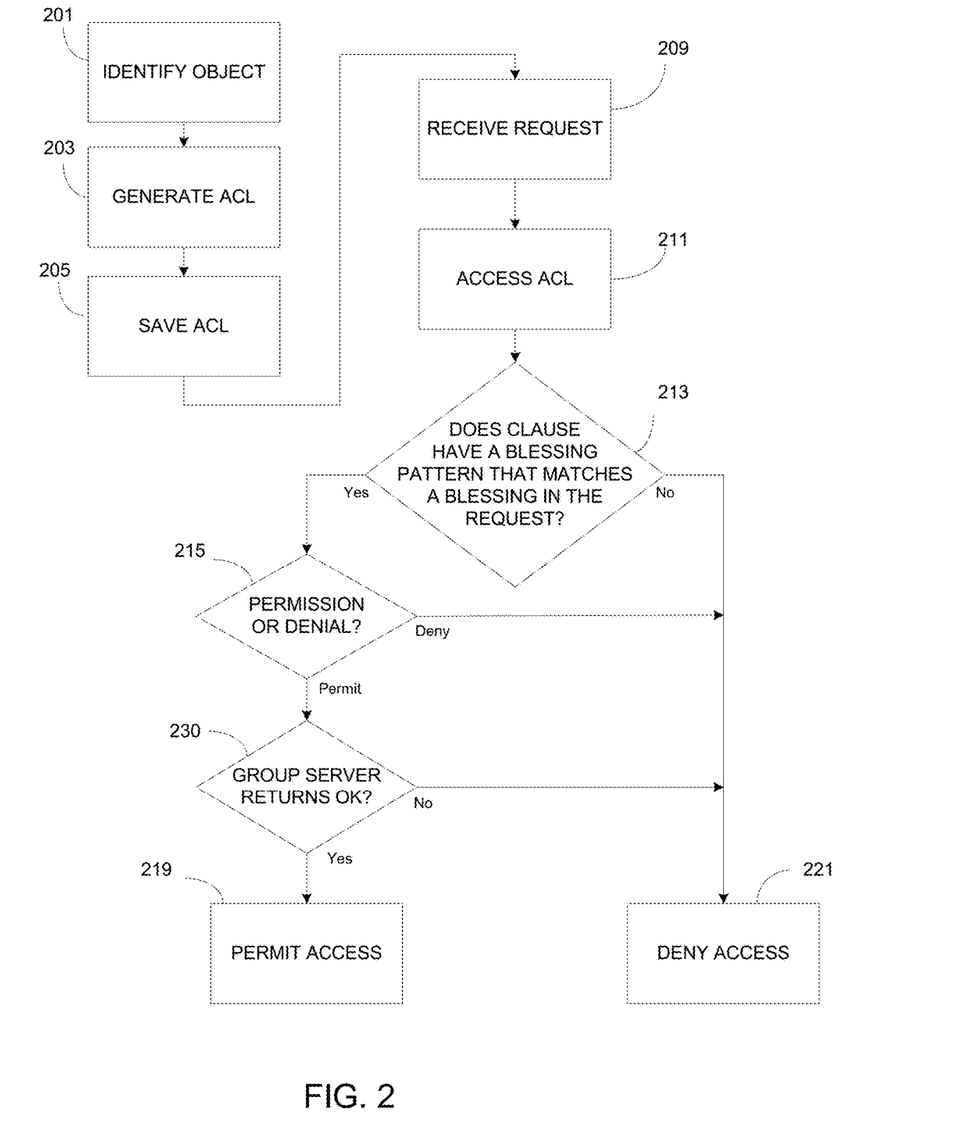
FIG. 2 is a flowchart illustrating various steps of a process of generating and using an access control list.

FIG. 2 illustrates an overview of an embodiment of a process, which will be described in more detail below. A server or other device having a processor may control sharing of an object between entities in a distributed system by identifying an object 201 and generating an access control list 203 for the object so that the ACL includes a list of clauses. Each clause in the ACL includes a blessing pattern comprising one or more blessings. One or more of the clauses may also include a reference to one or more groups, wherein each group represents a set of blessing patterns. Each clause may be either a "permit" clause or a "deny" clause to indicate whether the entity or entities that have a blessing matched by the blessing pattern are permitted to access the object. The system will save the ACL to a data store 205 for use in responding to a request to access the object.

When the system receives a request by a client device 209 to access the object, it will access the access control list (ACL) 211 and determine whether the ACL includes at least one clause with a relevant blessing pattern that matches a blessing presented in the request 213. If so, it will parse each determined clause of the ACL that has the relevant blessing to determine whether the clause is a permit clause or a deny clause 215. It will use results of the parsing to decide whether to grant or deny the client device access to the object, and then correspondingly either grant 219 or deny 221 the client device access to the object.

A system may need or wish to manipulate lists of blessings and lists of blessing patterns. In the example below, lists of blessings are an input to ACL checks; lists of blessing patterns appear in group definitions. Therefore, we introduce syntactic categories for them:

$$M ::= \text{empty} \quad \text{lists of blessings}$$
$$\quad | B, M$$

$$L ::= \text{empty} \quad \text{lists of blessings patterns}$$
$$\quad | L, P$$

We use the constant "empty" to represent the empty list, and use a comma as a binary operator for forming lists. In the examples shown in this document we may omit "empty" when appears in a list, and for example we may write the list "empty, Alice, Bob" as simply "Alice, Bob."

Group names may be of at least two types: those for built-in groups and those for defined groups. In both cases, a group can be thought of as a set of blessing patterns.

Built-in groups may be those that are provided by the underlying platform, so do not require extensional definition. The set of all blessings, to which we refer by the name "AllBlessings," is an example. In general, built-in groups may be implemented by fairly arbitrary pieces of code that answer, in particular, membership queries. Below we discuss the interface that such code should provide. Formally, we may assume a function Elts that maps each $g \in$ BuiltInGroups to a set of blessings (intuitively, the elements of g). For example, we let Elts(AllBlessings)=AllBlessings. As in this case, a set Elts(g) may be infinite.

Defined groups may be associated with definitions that equate a group name with a list of blessing patterns:
g=L Given a set DefSet of definitions $\{g_1=L_1, \ldots, g_k=L_k\}$, the system may require that the group names $g_i$ be pairwise distinct and distinct from elements in BuiltInGroups. Each group name may be associated with a server to aid in enforcement in a distributed manner.

On the other hand, the system may not require the absence of cycles in the definitions. Some simple cycles may occasionally be useful.

The system may allow for the possibility that some group names are neither in BuiltInGroups nor have a definition (or at least not a definition that is available to the system).

The system may allow one or more electronic devices to generate and output a user interface (or automated construction process) by which a user (or the system) may create new groups, delete groups, and modify group membership.

Both the code associated with built-in groups and the definitions associated with other group names may change over time. They may even change during an ACL check. Correctness expectations may have to be relaxed accordingly (for example, so as to allow reordering queries to servers).

An ACL is a list of clauses, each of which permits or denies access to blessings that match a particular blessing pattern. An ACL may be defined by:

$$A ::= \text{empty} \quad ACLs$$
$$\quad | A, \text{Allow} \ P$$
$$\quad | A, \text{Deny} \ P$$

As an example, in one implementation all "Allow" clauses (which also may referred to as "Permit" clauses) may precede all "Deny" clauses, but the opposite arrangement or no particular requirement may apply. In an order-dependent semantic arrangement, the system would know that:

"Allow Friends, Deny Alice"
is not the same as
"Deny Alice, Allow Friends".

In one embodiment, latter ACL entries will take priority over earlier ones, (although the opposite priority may be true in alternate embodiments). In this embodiment, when "Alice" is in the group "Friends", the latter ACL will give access to "Alice" and the former will deny it.

In this disclosure and in various embodiments we may abbreviate ACLs by combining consecutive Allow clauses, for example writing "Allow Friends, Alice" for "Allow Friends, Allow Alice", and similarly for consecutive Deny clauses. Many ACLs may be of a simple form such as "Allow g," where g is a group name. More generally, many may be of the form "Allow $P_1, \ldots, P_k$", or as another example:

Allow $P_1, \ldots, P_k$, Deny $P_{k+1}, \ldots, P_{k+k'}$
where $P_1, \ldots, P_{k+k'}$ are blessing patterns.

In some embodiments, the system may not allow naming ACLs. This limitation would mean that sharing happens through named groups.

Each blessing pattern—and, in particular, each group name—denotes a set of blessings. The following discussion explains how the system may map blessing patterns to sets of blessings.

Assuming a semantics of group names (a mapping from group names to sets of blessings, given as a parameter p), the function "Meaning" maps blessing patterns and lists of blessing patterns to sets of blessings. It is defined inductively as follows, first for blessing patterns:

$\text{Meaning}_\rho(n)=\{n\}$
$\text{Meaning}_\rho(g)=\rho(g)$
$\text{Meaning}_\rho(n/P)=\{n/s | s \in \text{Meaning}_\rho(P)\}$
$\text{Meaning}_\rho(g/P)=\{s/s' | s \in \text{Meaning}_\rho(g), s' \in \text{Meaning}_\rho(P)\}$ and then for lists of blessing patterns:
$\text{Meaning}_\rho(\text{empty})=\emptyset$
$\text{Meaning}_\rho(L, P)=\text{Meaning}_\rho(L) \cup \text{Meaning}_\rho(P)$ A semantics of group names basically includes a function $\rho$ that maps each group name to the set of members of the group. When an expression (for instance, an ACL) refers, directly or indirectly, to a group that has not been defined, then in a distributed context (in this instance, when the definitions are at different servers), the system may have to decide what happens when the group definition may exist but cannot be looked up, for whatever reason. If we wish the system to be conservative (fail-safe), its decision may be different in Allow and Deny clauses. For this reason, in this context the system may use two functions, referred to in this document $\rho \Downarrow$ and $\rho \Uparrow$. They coincide in the case in which all references to groups can be resolved.

For the construction of $\rho \Downarrow$, we may regard a list of group definitions DefSet as inducing formal languages, as follows.

Ordinary names and slashes (/) are terminals.
Group names are non-terminals.
The system may associate productions with the group definitions, for example turning the definition:
$g_1$=Alice/Phone, $g_2$/Phone
into the two productions
$g_1 \rightarrow$ Alice/Phone
$g_1 \rightarrow g_2$/Phone the system may also associate productions with each built-in-group name g:g→B for each B ∈ Elts(g).

Finally, the system may not associate productions with any remaining group names (those that are neither defined in DefSet nor built-in-group names).

For each group name g, the system may let $\rho \Downarrow$ (g) be the set of blessings generated from g by these productions. Thus, the question of group membership may be reduced to that of formal-language membership.

When Elts(g) is finite for each g ∈ BuiltInGroups, the productions above constitute a context-free grammar. Otherwise, the system may still obtain a formal language $\rho \Downarrow$ (g) for each group name g, though these need not be context-free languages. More precisely, much as in formal-language theory, $\rho \Downarrow$ is the least fixed-point of the function F such that, for every g, F($\rho$)(g)=Meaning$_\rho$(L) if g is defined by g=L;
F($\rho$)(g)=Elts(g) for g ∈ BuiltInGroups; and
F($\rho$)(g)=Ø otherwise.

The construction of $\rho \Uparrow$ is analogous, except that in the last case the system may let F($\rho$)(g)=AllBlessings. In particular, the system still takes a least fixed-point (not a greatest fixed-point).

In practice, the system may not always need to compute least fixed-points: it may treat (or find) some group definitions to be unavailable—for instance, when the corresponding server has failed, or when we have a computational budget is exhausted or approaching a limit. The result may be a conservative approximation.

In other systems, regular expressions are used in access control, for example in defining firewall rules. With the definitions above, the system may go beyond regular languages, in order to avoid cumbersome syntactic conditions in group definitions.

Figure 3:
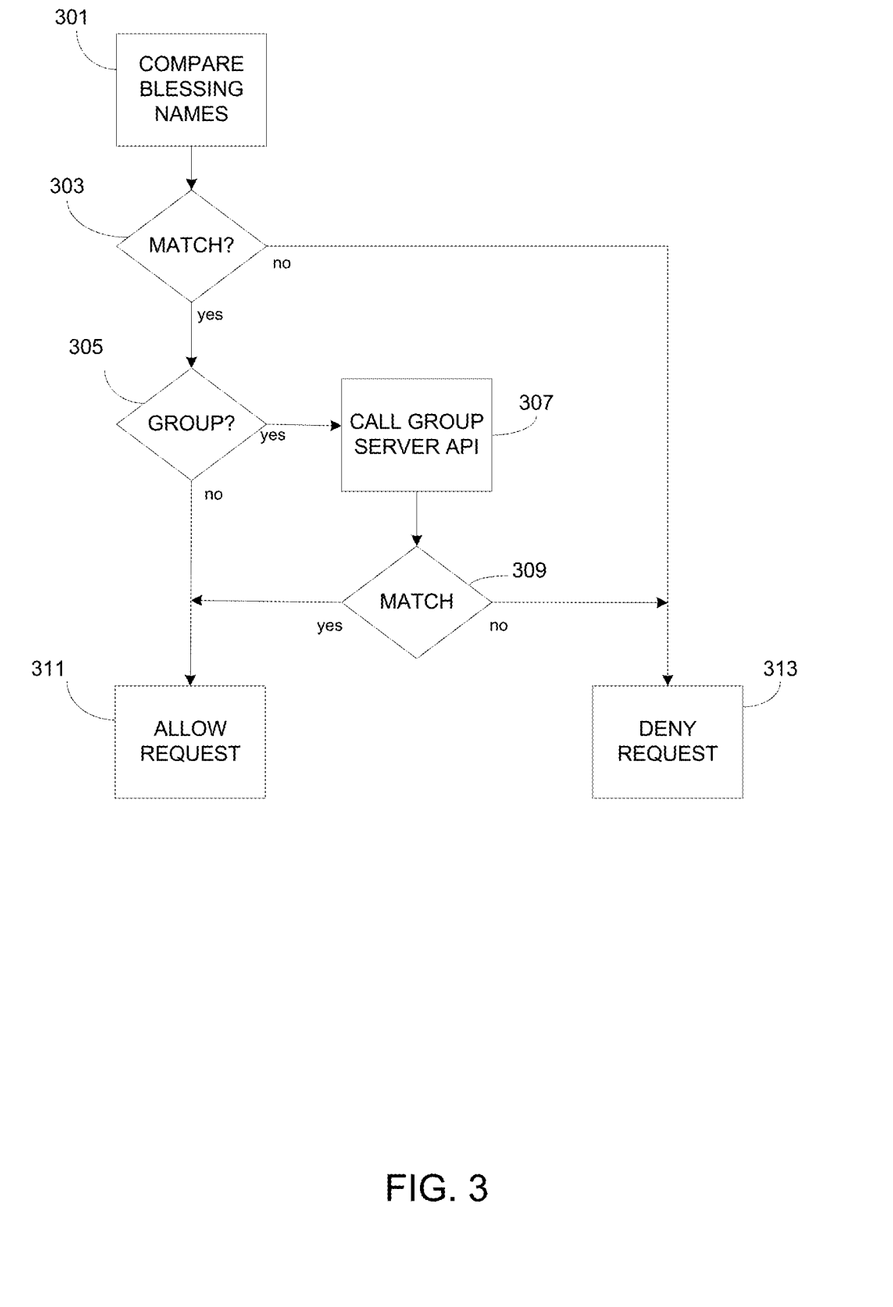
FIG. 3 is a flowchart illustrating an example of a matching process.

An ACL check will proceed when a processor receives a set of blessings (and optionally, group definitions) from a requesting entity and matches the presented blessings against each blessing pattern in the ACL for an object (optionally, using received group definitions, and others). An example of this process is shown in FIG. 3. The system may iteratively compare literal components in the blessing name against those in the blessing pattern, proceeding until the system encounters a group name in the pattern 301. The system may determine whether a match exists 303. If any literal components are not found in the blessing pattern, the system may determine that it's a mismatch and deny the request 313. If the blessing name is a prefix of the pattern, the system may determine it to be a match. When the system encounters a group name of the first time 305, it may send the remaining unmatched portion of the blessing name (the remainder, discussed below) to a group server via a group server API 307. The group server will match the remainder against each group member using the same matching algorithm (applied recursively) and return a new set of remainders. If the remainder set is non-empty after the entire pattern has been consumed, then the system may declare a match 309 and allow the request 313. Otherwise, it may deny the request 303. If the pattern is $-terminated (described below), then optionally the system may declare a match only if the remainder set contains the empty string (signifying an exact match). Optionally, if the group server is unreachable, it may treat the group as either empty (if the blessing pattern was an Allow clause) or all-inclusive (if the blessing pattern was a Deny clause).

We may illustrate this matching algorithm with a simple example. Suppose we have:
Blessing name (presented by client): "a/b/c/d/e"
Blessing pattern (at the server): "a/bkgrp:v/g$_1$>"
Group definition (v/g$_1$): {"c", "c/d", "c/d/e", "e"}

If we expand the pattern with the group's definition, the resulting patterns are "a/b/c", "a/b/c/d", "a/b/c/d/e" and "a/b/e". Blessing name "a/b/c/d/e" successfully matches the patterns "a/b/c", "a/b/c/d" and "a/b/c/d/e". (As noted above, a blessing name may match a blessing pattern if the pattern is a prefix of the name.)

However, to determine the match without learning the group's definition (using the Rest function as specified above and described below), the system may proceed by matching each blessing name component with a component in the pattern. The first two components "a", "b" of the blessing name match the first two components of the pattern. The system may then match the blessing chunk "c/d/e" against the group "v/g1". Hence, we send a Rest ("c/d/e") RPC to the group server. Given the group definition, the remainder set after group server matching is {"e", "d/e", ""}. This remainder set is returned as the output of the Rest( ) call. The system may declare a match since it has a non-empty (i.e., not { }) remainder set at the end.

A principal that has collected multiple blessings may present a subset for the purposes of an authorization decision. It may decide not to present all its blessings, perhaps because of concerns about performance or confidentiality. However, it should not gain additional rights by virtue of withholding some blessings.

Accordingly, a function that performs authorization checks, e.g., "IsAuthorized," is applied to a list of blessings M and an ACL A. It decides whether access should be granted according to A when the blessings in M are presented. It is defined in terms of an auxiliary function IsAuthorized$_1$(B, A) that is applied to a single blessing B and an ACL A. Since each blessing B is treated separately, IsAuthorized(•, A) is monotonic in its first argument, as desired.

---

IsAuthorized(M, A) = ∃B ∈ M.IsAuthorized$_1$(B, A)
IsAuthorized$_1$(B, A) =
   case A of
     empty : false
     | A', Allow P : (∃B' ∈ Meaning$_\rho \Downarrow$(P).
     B' ≼ B) ∨ IsAuthorized$_1$
     (B, A')
     | A', Deny P : (¬∃B' ∈ Meaning$_\rho \Uparrow$(P).
     B' ≼ B) ∧ IsAuthorized$_1$
     (B, A')

---

This definition relies on the mappings $\rho \Downarrow$, $\rho \Uparrow$, and "Meaning," described above. It may be intended as a specification, without a necessary concrete implementation.

According to this embodiment, the semantics of ACLs is order-dependent, with later ACL clauses winning over earlier ones. For example, for any blessing pattern P, the ACL "Allow P, Deny P" always denies access.

ACL clauses that refer (directly or indirectly) to undefined groups are treated conservatively by relying on $\rho \Downarrow$ and $\rho \Uparrow$ depending on the type of clause. This conservative treatment may be done one entry at a time. In some cases, this approach might yield slightly surprising (but safe) results. Consider, for example, the unusual ACL "Allow Alice, Deny Friends, Allow Friends", where "Friends" is a group name but it has no corresponding definition, or its definition is unavailable, and "Friends" is not in BuiltInGroups. Suppose that the system wished to know whether this ACL allows access to a request with the blessing "Alice". The system may start to analyze the ACL from the end. The clause "Allow Friends" does not permit access, because the system makes the conservative assumption that "Friends" is empty. The clause "Deny Friends" denies access, because the system makes the conservative assumption that "Friends" contains all blessings. Thus, in this example the system may never look at "Allow Alice", and it may deny access.

The definition uses the prefix relation≤(instead of requiring exact equality) for checking both Allow and Deny clauses. The choice of≤has different significance in at least the two following cases:

First, for Allow clauses, the use of the relation≤is a matter of convenience. For example, when one writes the ACL "Allow Alice" for an object that one wishes to share with a principal with the blessing "Alice," it is typically expedient that this principal gain access even when this access may happen via a phone with the blessing "Alice/Phone." Thus, lengthening a blessing does not reduce authority with respect to the Allow clauses in ACL checks. The longer blessing is however not equivalent to the shorter one in other respects: the longer blessing may trigger a Deny clause, and a principal that holds the blessing "Alice/Phone" cannot in general obtain other extensions of "Alice," such as "Alice/TV."

This semantics is definable from a semantics that requires exact equality. For example, under the latter semantics, one could write the ACL "Allow Alice, Alice/AllBlessings" rather than "Allow Alice". Conversely, even with the semantics that uses ≤ it is possible to define ACLs that insist on exact equality. For example, one can write "Allow Alice, Deny Alice/AllBlessings". Alternatively, assuming that "$" is a reserved name that appears in blessings only at the end, one can write "Allow Alice/$"

Second, for Deny clauses, it generally does not make sense to forbid access with the blessing B but to permit it with a longer blessing, from a security perspective. Whoever has B would be able to extend it in order to circumvent the Deny check.

One may use an alternate criterion for matching in Allow clauses, which we will refer to as "prefix matching". For example, with this criterion, the ACL "Allow Alice/Phone" would permit access with the blessing "Alice". The main motivation for this decision is that denying this access has no clear security benefit. Whoever holds "Alice" could form "Alice/Phone" in order to gain access.

As an example of authorization checks, the function IsAuthorized, as defined above, might be implemented by calculating the functions $\rho\Downarrow$, $\rho\Uparrow$, and "Meaning" at the relying party, then applying the definitions blindly. However, these calculations generally require knowledge of the group definitions, which the system may not want to disseminate for reasons of efficiency and privacy. The relevant groups might even be infinite, and thus not able to be enumerated. Moreover, a full computation of "Meaning" is sometimes not required for determining if some particular blessing is or is not a member of the corresponding set of blessings. Therefore, an embodiment may use distributed, query-driven implementations of IsAuthorized. In the discussion below, we first reduce IsAuthorized to a basic function R, then we discuss how to implement the required invocations of R. This may be considered to be a form of top-down parsing.

Other algorithmic approaches may be derived from work on formal languages.

Suppose that the system wishes to know whether a particular blessing is in Meaning$_\rho$(P). When the blessing is an ordinary name n, the system may proceed as follows:

If P=m or P=m/P$_1$ or P=n/P$_1$ or P=g/P$_1$ then fail, for every m ≠ n and every group name g.
If P=n then succeed.
If P=g then ask a server responsible for g whether n is an element of g and return the result.

When the blessing is a compound blessing n/B$_1$, the system may instead proceed as follows:
If P=m or P=m/P$_1$ then fail, for every m ≠ n.
If P=n then fail.
If P=n/P$_1$ then recurse with B$_1$ and P$_1$.
If P=g then ask a server responsible for g whether n/B$_1$ is an element of g and return the result.
If P=g/P$_1$ then ask a server responsible for g whether there exist B$_2$, B$_3$ such that n/B$_1$=B$_2$/B$_3$, and B$_2$ is an element of g, and if so recurse with B$_3$ and P$_1$ (for each suitable B$_3$, for completeness).

Thus, a server responsible for g may answer questions of the following forms:
whether a blessing B is in Meaning$_\rho$(g),
whether a blessing B can be written in the form B$_2$/B$_3$ where B$_2$ is an element of Meaning$_\rho$(g).

While each question of the latter kind can be reduced to several questions of the former kind (one per prefix B$_2$ of B), providing an interface for asking questions of the latter kind may allow a more direct, efficient interaction.

Therefore, the system may assume a function R (which this document may call a "Rest function") with the following specification: R is such that, given a blessing B and a set of blessings S, R(B, S) returns the set that consists of:
∈ if B is an element of S, and
every blessing B' such that for some B' we have B=B'/B" and B' is a member of S.

Note that R(B, S) may, in general, contain both blessings and the empty string ∈. For example, if S={n$_1$, n$_1$/n$_2$, n$_1$/n$_2$/n$_3$} then R(n$_1$/n$_2$, S)={∈, n$_3$}. The name R stands for "rest", "remainder", or "residue". The Rest function may be used to determine whether a blessing or a blessing pattern is a member of a particular group, while allowing the group server to shield the entire contents of the group from the requesting entity. Below we consider how the system may implement this Rest function, R.

Using R, the system can reformulate the definition of IsAuthorized:

IsAuthorized(M, A) = ∃B ∈ M.IsAuthorized$_1$(B, A)
IsAuthorized$_1$(B, A) =
  case A of
    empty : false
    | A', Allow P : R(B, Meaning$_\rho\Downarrow$(P)) ≠ ∅∨ IsAuthorized$_1$(B, A')
    | A', Deny P : R(B, Meaning$_\rho\Uparrow$(P)) = ∅∧ IsAuthorized$_1$(B, A')

Next we consider how the system may compute and approximate R(B, Meaning$_\rho\Downarrow$(P)) and R(B, Meaning$_\rho\Uparrow$(P)) without fully expanding the definitions of $\rho\Downarrow$, $\rho\Uparrow$, and Meaning. We present basic example algorithms first, then elaborate on distributed implementations.

First, assume that we have R(B, Elts(g)) for each g ∈ BuiltInGroups. In practice, this assumption may mean that the code that implements a built-in group g should offer an interface for asking queries of the form R(B, Elts (g)). Note that R(B, Elts(g)) is always finite, even when Elts(g) is infinite. In the case of AllBlessings, this set comprises the empty string and the proper suffixes of B. We may write S(B) to represent this set. If we want functions R$\Downarrow$ and R$\Uparrow$ such that:

$R \Downarrow (B, P) = R(B, Meaning_\rho \Downarrow (P))$
$R \Uparrow (B, P) = R(B, Meaning_\rho \Uparrow (P))$
where $R \Downarrow$ and $R \Uparrow$ have, as an implicit parameter, the group definitions DefSet. For brevity, in this document we may write $R_X$ when we wish to refer to both $R \Downarrow$ and $R \Uparrow$ (but, in an equation such as $R_X(\ldots) = R_X(\ldots)$ ... we mean the same $R_X$ on both sides). Given a list of blessing patterns $L=P_1, \ldots, P_k$, we let $R_X(B, L) = \cup_{i=1 \ldots k} R_X(B, P_i)$.

The desired functions $R \Downarrow$ and $R \Uparrow$ satisfy the equations:

$R_X(n, n) = \{\epsilon\}$ $R_X(n, m) = \theta$ if $m \neq n$ $R_X(n/B, n) = \{B\}$ $R_X(n/B, m) = \theta$ if $m \neq n$ $R_X(n, m/P) = \theta$ $R_X(n/B, n/P) = R_X(B, P)$ $R_X(n/B, m/P) = \theta$ if $m \neq n$ $R_X(B, g) = \begin{cases} R_X(B, L) \text{ if } g = defL \in DefSet, \text{ or else} \\ R(B, Elts(g)) \text{ if } g \in BuiltInGroups, \text{ or else} \\ \theta \text{ if } X \text{ is } \Downarrow, \text{ or else} \\ S(B) \text{ if } X \text{ is} \Uparrow \end{cases}$ $R_X(B, g/P) = \{s \mid \exists s' \neq \epsilon, s' \in R_X(B, g), s \in R_X(s', P)\}$ When oriented from left to right, these equations immediately suggest an algorithm for computing $R_X(B, P)$. This system implements the algorithm by proceeding by cases on the form of P. When P is not a group name and does not start with a group name, the algorithm then proceeds by cases on the form of B. When P is a group name g with a definition g=L in DefSet, the algorithm unfolds this definition. When P is a group name $g \in BuiltInGroups$, the algorithm simply returns R(B, Elts(g)), which we have according to our assumptions. Finally, if P is any other group name g (so, a group name for which no definition or implementation is available), the algorithm returns $\emptyset$ (for $R \Downarrow$) or S(B) (for $R \Uparrow$).

In this way, if an entity that controls an ACL makes a request of a group server, and the request includes a blessing pattern such as "A/B", the group server may return one or more indicia that the group includes "A" and the remainder R is "B". This allows the system to tailor a response to the specific request made, without revealing other information about the group.

The computation of $R_X(B, P)$ basically amounts to parsing B, top-down, as an element of the formal language associated with P. It is common for top-down parsing not to work, or not to work well, when any grammar productions are left-recursive (of the form $g \rightarrow g \ldots$ where g is a nonterminal). Here, left-recursion could cause the algorithm to fall into an infinite loop. In theory, left-recursive productions can always be avoided (in particular, by using Greibach normal form). In an embodiment, however, we may not wish to restrict or to rewrite group definitions in order to prevent left-recursion.

Therefore, the system may use weaker definitions of $R \Downarrow$ and $R \Uparrow$ that work without the assumption. For a conservative implementation, we require only:

$R \Downarrow (B, P) \subseteq R(B, Meaning_\rho \Downarrow (P))$
$R \Uparrow (B, P) \supseteq R(B, Meaning_\rho \Uparrow (P))$ The system may apply an adapted algorithm to achieve these properties while improving its efficiency and guaranteeing its termination. In particular, the system may allow calculations to terminate—with a conservative decision—whenever a given computational budget has been exhausted. As a special case, the system may allow queries on servers to time out. Furthermore, by passing an additional argument to Ru and Rfi, the system may keep track of the set of groups that we have examined, and terminate—again, with a conservative decision—when it detects a loop. There may be variants that detect all loops or only those loops that arise as a result of left-recursion. Only the latter loops cause divergence, but the former variant is a little simpler.

Writing $R \Downarrow$ (B, P) and $R \Uparrow$ (B, P), respectively, for these approximations of R(B, $Meaning_\rho \Downarrow$ (P)) and R(B, $Meaning_\rho \Uparrow$ (P)), the system may obtain a conservative implementation of IsAuthorized:

---
$IsAuthorized^{imp}(M, A) = \exists B \in M.IsAuthorized_1^{imp}(B, A)$
$IsAuthorized_1^{imp}(B, A) = $
   case A of
      empty : false
      | A', Allow P : $R \Downarrow$ (B, P) $\neq \emptyset \vee IsAuthorized_1^{imp}(B, A')$
      | A', Deny P : $R \Uparrow$ (B, P) $= \emptyset \wedge IsAuthorized_1^{imp}(B, A')$
---

Thus, we replace occurrences of R with $R \Downarrow$ for "Allow" checks and with $R \Uparrow$ for "Deny" checks.

The ACL check for the portion of the ACL that corresponds to a blessing may be directed to a first processing device, while the check for the portion of the ACL that corresponds to a group may be directed to a separate group server. If so, then (referring to FIG. 2) the entity that controls the ACL may communicate with the group server to obtain the relevant details for the group to determine whether the request is authorized, and only permit the request of the request is associated with an authorized group 230.

When ACLs and groups are defined in terms of other groups, we now explain how the corresponding servers or other processing devices may contribute to an ACL check. This process may be orchestrated by the client that requests access or by the entity that holds the ACL. For example, if the ACL refers to a group $g_1$ which is itself defined in terms of a group $g_2$, the client may obtain and present evidence about $g_1$ and $g_2$, or the entity that holds the ACL may do the lookups for both groups. Alternatively, this entity may contact a server responsible for $g_i$, which in turn may contact a server responsible for $g_2$.

Optionally, the system may adopt an alternative scheme as its primary one. If so:
   the evaluation of IsAuthorized$^{imp}$(M, A) may happen locally at the entity that holds A, with calls to others for evaluating $R_X$;
   the evaluation of $R_X$(B, P) may use local recursive calls in all cases indicated by the definition of $R_X$, except in the case of $R_X$(B, g), for which a server responsible for g should be consulted (unless, as indicated above, this would cause looping).

In practice, this scheme can be subject to various optimizations, such as caching, batching of queries, and "pushing" of credentials by clients.

With this scheme, ACLs and the group memberships may be partly revealed only in response to queries (IsAuthorized$^{imp}$ queries for the ACLs, $R_X$ queries for the groups). An observer who can see enough message flows may also infer dependencies, namely that particular ACLs or groups depend on certain other groups. However, the full contents of ACLs and groups may not be disclosed wholesale.

Without atomicity assumptions, it is possible that group definitions are changing during the evaluation of IsAuthorized$^{imp}$(M, A). For example, let A be the ACL "Allow Friends, Deny Friends", and suppose that a member (Alice) is being added to the group "Friends". If the addition to the group happens between the processing of the two clauses of the ACL, IsAuthorized$^{imp}$(Alice, A) will return true, a behavior that could happen neither before nor after the addition. To prevent this behavior, the system may ask the servers or other processing devices responsible for the relevant groups to provide information current as of the time of the ACL check of interest, via an extra "time" parameter for $R_X$. Assuming that the processing devices keep a log of recent group changes, this technique would help for ACL checks that complete reasonably fast, subject to the limitations of clock synchronization.

We now elaborate on prefix matching, described above. Optionally, the system may not adopt it. The reasons may have to do with Deny clauses and groups; they are weaker if either of those features is absent. Since prefix matching is not essential for expressiveness or usability, it may be omitted in order to give a better treatment of those features. However, various embodiments may include prefix matching.

The rationale for prefix matching is as follows. Suppose that a blessing B' matches an ACL and that B≤B'. Whoever holds B can extend it to B', thus passing the ACL check; therefore, not letting B match the ACL may cause inconvenience and has no immediate benefit if B behaves maliciously. (It may however protect against accidental misbehavior.)

Adopting prefix matching would mean, for example, that the ACL "Allow $n_1/n_2$" grants access when the blessing $n_1$ is presented.

Also consider the ACL "Allow $n_1/g$" and imagine that g is defined to be empty. Should access be granted when the blessing $n_1$ is presented? A positive answer would seem rather surprising, and is not justified by the proposed rationale for prefix matching: there is no way to extend $n_1$ so that it matches $n_1/g$ exactly. Prefix matching for a blessing pattern P($n_1/g$ in this example) is about the prefixes of the blessings that match P, not the blessings that match the prefixes of P. In other words, it is about the prefixes of the meaning of P, not the meaning of the prefixes of P.

Next consider the ACL "Allow n1/n2, Deny n1/n2". Should access be granted when the blessing $n_1$ is presented? The system could answer this question positively by computing the meaning of the Allow clause (which, with prefix matching, implies authorizing $n_1$), the meaning of the Deny clause (which does not imply rejecting $n_1$), and then taking the difference. This behavior may not be justified by the proposed rationale for prefix matching, as there is no way to extend $n_1$ so that it matches $n_1/n_2$ but does not match $n_1/n_2$.

An alternative approach includes computing all the blessings allowed by the entire ACL (subtracting for Deny clauses, but without prefixing for Allow clauses), and then adding all their prefixes. As the example illustrates, subtracting for Deny clauses does not commute with adding prefixes. This alternative approach does conform to the rationale for prefix matching.

In practice, the alternative approach may be difficult to implement. Consider the ACL "Allow $n_1/g_1/\$$, Deny $n_1/g_2/\$$", where $g_1$ and $g_2$ are group names and \$ is a designated terminator name. According to the alternative approach, access should be granted when the blessing $n_1$ is presented if and only if there is some element of $g_1$ that is not in $g_2$.

In conclusion, as noted above, many systems of the prior art support distributed authorization. Where their features include groups, the prior art provides no canonical solution to problems such as missing, unavailable, and circular group definitions.

The disclosed embodiments can mitigate those difficulties by providing ACLs with groups and negative clauses. This choice also enables us to provide a liberal semantics for ACLs (in which, for example, the ACL "Allow Alice" permits access to "Alice/Phone") distinct from that of groups (according to which a group that contains "Alice" need not contain "Alice/Phone"). In the prior art, an ACL that would grant access to Alice would generally not automatically grant access to a compound principal of the form "Alice op Phone," where op is a binary operator, unless this operator happens to be conjunction (Λ). Conjunction hardly resembles /, for example because it is commutative; other operators previously considered seem closer to /. Beyond these differences, the fact that the present embodiments may have only one operator (/) and that it is associative allows the present system to sharpen the helpful connection with formal languages.

All blessings for a principal may be stored in a blessing store, akin to a cookie jar in web browsers. The store marks the blessings to be presented when acting as a server.

Thus, various embodiments may use several unique features. For example, the system may write ACLs in terms of specific delegates of a principal, rather than all delegates of a principal. For example, the user may wish an ACL to allow the "calendar" application (or another interactive application) on each of a user's client electronic devices access to the user's "my calendar" data, without allowing other applications, or devices, such access.

Also, the system may use groups to refer to particular sets of delegates of arbitrary identities. This causes us to use groups to represent arbitrary sub-strings of identities, rather than just prefixes. For example, suppose the user buys a version of a particular productivity suite called "Product X", which includes particular versions of certain applications. The system may write an ACL that allows any of those programs to access some file when running on any of the user's devices. When running on the user's phone, one of those applications might wield the identity "company/mike/phone/productx_v4".

The user may wish the ACL still to be valid if he or she upgrades the copy of Product X from v4 to v5, or to add another application from the same Provider. Thus the system might write an ACL entry of the form {mikes_devices}/{provider_suite} (where the names refer to groups) that expands to any app in the Provider's product suite running on any of the user's devices. The "mikes_devices" group would be curated by the user, but the "provider_suite" group would be curated by the Provider of Product X.

In addition, the system may allow "deny" clauses in its ACLs. For example, the system may allow access for an object to all employees except interns—the interns could be mentioned in a "deny" clause.

The system may provide for peer-to-peer communication between devices that are (temporarily) disconnected from the Internet. For example, one device might interact with another while both are on a plane, disconnected from the Internet, and access control checks must be conservative, even if up to date information about group memberships is unavailable.

The system may provide an open-ended, hierarchical group structure, where anyone may define a group with arbitrary membership, including other groups. Thus, a given identity may be in or implied by, an arbitrary number of groups, scattered widely over the distributed system. In other words, it may not be easy to discover a "complete" set of groups that one must consult for all access control decisions involving a particular identity.

The system is protective of privacy: The owner of a group may not wish to reveal its complete membership to systems checking ACLs. The owner of an ACL may not wish to reveal all the groups the ACL mentions to clients. Clients may not wish to reveal to others the identity of groups to which they belong. Following the example, imagine that the developer of a calendar application wishes to set the ACL on the user's calendar data, and suppose that the user currently has two devices: his tablet and his laptop. The developer could conceivably include the identities "user/tablet/calendar" and "user/laptop/calendar" on the ACL. But this would be inconvenient when the user acquires a phone, which must then be added to this ACL, and similar ACLs in all of the user's applications.

Alternatively, one could use a group to get a simple level of indirection, so the ACL grants access to the group "users_calendar" which would contain the identities listed above. That also is inconvenient, because again, each application would have its own group, and every one would have to be edited when the user buys a phone.

The embodiments of this document solve this by allowing the user to have a single group that enumerates his devices, but which can be used to derive a set of identities for each application whose ACL refers to that single group. So the group G might contain "user/tablet" and "user/laptop", and the ACL entry "G/calendar" would then achieve the desired result.

In some embodiments, the system may use caching to store group membership or the results of inquiries to the group server over time. In this way, a request can also be associated with a time. The consideration of time may allow a request to consider whether a blessing pattern was part of a group at a particular time. It can also help manage offline operations, and/or ensure that a request made at a particular time returns a correct answer it the group is being updated or modified at the time that the request is being made.

To address these issues, the client and/or the group server may maintain in a computer-readable memory a cache of the results of inquiries to the group server. To describe this, the discussion below uses the terms "client", "server", and "group server" to refer to the three parties involved in an access request/check. Any processing device may serve as any of the three entities.

With server-side caching, the server caches Get/Rest responses from the group server, and uses these cached responses (if available) when performing subsequent access checks. The server may maintain the cache for a limited period of time, such as one hour, one day, one week, one month, or any other appropriate period of time. Then, when the server receives a request, it may associate a time with the request. The associated time may be received with the request, such as a time stamp or other time representation that is generated by a clock. Alternatively, the server may associate a different time, such as a time that the ACL was edited, or a time in which the requested object was edited (such as a most recent edit). The server may identify the cache that corresponds to the time (such as the cache entry with the same time or the closest prior time). It may then use the identified cache to determine whether the request is associated with an authorized group.

With client-side caching, the client may encode a time into the ACL. For example, the client may acquire opaque or tamper-proof Get/Rest responses from group server or other server, and it may include any relevant responses in subsequent requests to the server. For example, the server may include an opaque (server-encrypted) "ticket" in its response to the client, and encode any relevant group server responses. The client may store this ticket and present it on subsequent requests. The ticket is opaque and therefore does not leak information to the client. Optionally, cached responses may be made tamper-proof by having the group server compute a checksum, encrypting it using its private key, and appending the encrypted checksum to the response. Any party with the corresponding public key could then decrypt and verify the checksum.

Figure 4:
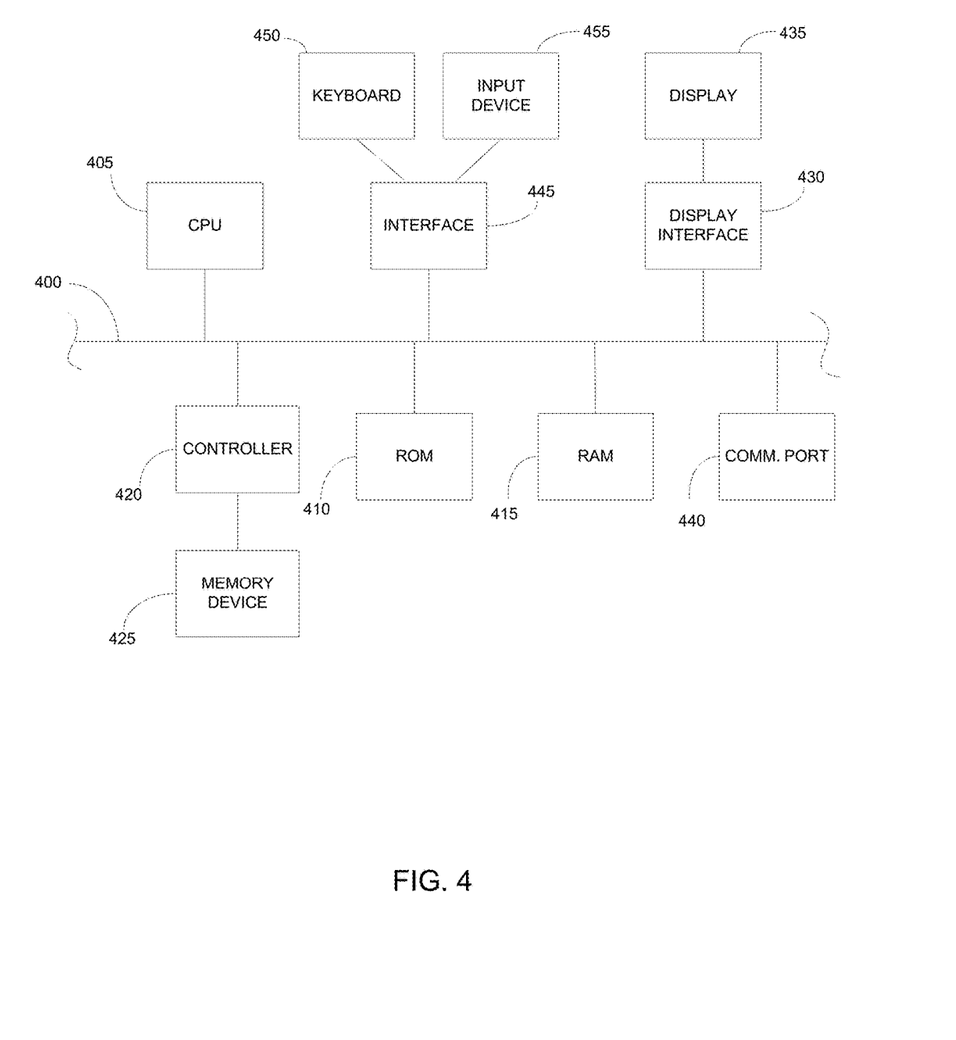
FIG. 4 illustrates a block diagram of example hardware that may be used to contain or implement program instructions and communication with other devices according to various embodiments.

FIG. 4 depicts a block diagram of hardware that may be used to contain or implement program instructions. A bus 400 serves as an information highway interconnecting the other illustrated components of the hardware. Processor (CPU) 405 is a central processing device of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media (i.e., memory device 425) to the system bus 400. These storage media may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on the storage media 425 discussed above.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communication network, such as the Internet or an intranet.

The hardware may also include an interface 445 which allows for receipt of data from input devices such as a keyboard 450 or other input device 455 such as a mouse, a touch pad, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of controlling sharing of an object between entities in a distributed system, the method comprising:

by a processing device:
  identifying an object;
  generating an access control list (ACL) for the object so that the ACL includes a list of clauses, in which at least one clause includes a blessing pattern that includes a reference to one or more groups, wherein:
    each blessing pattern comprises a slash-separated sequence of components, where each component comprises either a slash-free string of a blessing or a group reference, and
    each group represents a set of strings, wherein the set of strings represent one or more second blessing patterns or one or more fragments of one or more second blessing patterns;
  saving the ACL to a data store for use in responding to a request to access the object;
  receiving, from a client device, a request to access the object, wherein the request includes at least one blessing;
  accessing the ACL;
  determining that the ACL includes at least one clause with a blessing pattern that matches a blessing in the request;
  parsing each determined clause of the ACL that has the relevant blessing pattern to determine whether the clause comprises a permit clause or a deny clause; and
  using results of the parsing to decide whether to grant or deny the client device access to the object, and in response either granting or denying the client device access to the object.

2. The method of claim 1, wherein generating the ACL comprises generating each clause as either a permit clause or a deny clause, thus indicating whether an entity or entities that have a blessing matched by the blessing pattern are permitted to access the object.

3. The method of claim 1, wherein:
  determining that the ACL includes at least one clause comprises determining that the ACL includes multiple clauses with a matching blessing pattern; and
  using results of the parsing to decide whether to grant or deny the client device access to the object comprises granting the client device access to the object only if the later of the determined clauses comprises the permit clause, otherwise denying the client device access to the object.

4. The method of claim 1, wherein:
  determining that the ACL includes at least one clause comprises determining that the ACL includes multiple clauses with a matching blessing pattern; and
  using results of the parsing to decide whether to grant or deny the client device access to the object comprise granting the client device access to the object only if the earlier of the determined clauses comprises the permit clause, otherwise denying the client device access to the object.

5. The method of claim 1, wherein:
  determining that the ACL includes at least one clause comprises determining that the ACL includes a group; and
  the method further comprises:
    sending a request to a group server to determine whether the request is associated with a member of the group,
    receiving a response from the group server, and
    also using the response from the group server when deciding whether to grant or deny the client device access to the object.

6. The method of claim 5, wherein receiving the response from the group server comprises:
  receiving a first indication comprising a portion of the request that is associated with the group; and
  receiving a second indication comprising a remainder of the request that is not associated with the group.

7. The method of claim 1, wherein each blessing and group is represented by one or more human-readable names.

8. The method of claim 1, wherein at least one of the group names is embedded within an individual component of a blessing pattern.

9. The method of claim 5, further comprising, by the group server:
  saving a definition of a group to a computer readable memory so that the definition of a group is associated with a first time;
  saving an updated definition of a group to the computer readable memory so that the updated definition of a group is associated with a second time; and
  when generating the response, determining a time associated with the request, and using the time to determine which version of the group definition to use in evaluating the request.

10. A system for controlling sharing of an object between distributed entities, the system comprising:
  a processing device;
  a first data store portion comprising a plurality of stored objects;
  a second data store portion; and
  a computer-readable memory containing programming instructions that are configured to cause the processing device to:
    identify an object from the first data store portion,
    generate an access control list (ACL) for the object so that the ACL includes a list of clauses, in which at least one clause includes a blessing pattern that includes a reference to one or more groups, wherein:
      each blessing pattern comprises a slash-separated sequence of components, where each component comprises either a slash-free string of a blessing, a group reference; and
      each group represents a set of strings, wherein the set of strings represent one or more second blessing patterns or one or more fragments of one or more second blessing patterns,
    save the ACL to the second data store portion for use in responding to a request to access the object,
    receive, from a client device, a request to access the object, wherein the request includes at least one blessing,
    access the ACL,
    determine that the ACL includes at least one clause with a blessing pattern that matches a blessing in the request,
    parse each determined clause of the ACL that has the relevant blessing pattern to determine whether the clause comprises a permit clause or a deny clause, and
    use results of the parsing to decide whether to grant or deny the client device access to the object, and in response either grant or deny the client device access to the object.

11. The system of claim 10, wherein the instructions to generate the ACL comprise instructions to generate each clause as either a permit clause or a deny clause, thus indicating whether an entity or entities that have a blessing matched by the blessing pattern are permitted to access the object.

12. The system of claim 10, wherein:
the instructions to determine that the ACL includes at least one clause comprise instructions to determine that the ACL includes multiple clauses with a matching blessing pattern; and
the instructions to use results of the parsing to decide whether to grant or deny the client device access to the object comprise instructions to grant the client device access to the object only if the later of the determined clauses comprises the permit clause, otherwise deny the client device access to the object.

13. The system of claim 10, wherein:
the instructions to determine that the ACL includes at least one clause comprise instructions to determine that the ACL includes multiple clauses with a matching blessing pattern; and
the instructions to use results of the parsing to decide whether to grant or deny the client device access to the object comprise the instructions to grant the client device access to the object only if the earlier of the determined clauses comprises the permit clause, otherwise deny the client device access to the object.

14. The system of claim 10, wherein:
the instructions to determine that the ACL includes at least one clause comprise instructions to determine that the ACL includes a group; and
the system further comprises additional programming instructions configured to cause the processor to:
send a request to a group server to determine whether the request is associated with a member of the group,
receive a response from the group server, and
also use the response from the group server when deciding whether to grant or deny the client device access to the object.

15. The system of claim 14, wherein the instructions to receive the response from the group server comprise instructions to:
receive a first indication comprising a portion of the request that is associated with the group; and
receive a second indication comprising a remainder of the request that is not associated with the group.

16. The system of claim 10, wherein each blessing and group is represented by one or more human-readable names.

17. The system of claim 10, wherein at least one of the group names is embedded within an individual component of a blessing pattern.

18. The system of claim 14, further comprising:
the group server, wherein the group server comprises a group server processor; and
a computer-readable memory portion containing programming instructions that are configured to instruct the group server to:
save a definition of a group to a third data store portion so that the definition of a group is associated with a first time;
save an updated definition of a group to the third data store portion so that the updated definition of a group is associated with a second time; and
when generating the response, determine a time associated with the request, and use the time to determine which version of the group definition to use in evaluating the request.

* * * * *